United States Patent [19]
Kolev et al.

[11] Patent Number: 5,956,646
[45] Date of Patent: Sep. 21, 1999

[54] METHOD FOR SYNCHRONIZING TRANSACTION IDENTIFIERS IN A MOBILE SATELLITE COMMUNICATION SYSTEM

[75] Inventors: Javor P. Kolev, Durham; Carsten Hoirup, Raleigh, both of N.C.

[73] Assignee: Ericsson, Inc., Research Triangle Park, N.C.

[21] Appl. No.: 08/781,940

[22] Filed: Dec. 3, 1996

[51] Int. Cl.[6] ............................ H04B 7/005; H04B 7/185
[52] U.S. Cl. ..................... 455/502; 455/12.1; 455/517
[58] Field of Search .................................. 370/401, 338; 455/466, 422, 414, 517, 502, 12.1; 375/356

[56] References Cited

U.S. PATENT DOCUMENTS

| | | | |
|---|---|---|---|
| 5,416,770 | 5/1995 | Stoner et al. | 455/518 |
| 5,602,903 | 2/1997 | LeBlanc et al. | 455/456 |
| 5,625,880 | 4/1997 | Goldburg et al. | 455/507 |
| 5,678,179 | 10/1997 | Turcotte et al. | 340/825.44 |
| 5,701,298 | 12/1997 | Diachina et al. | 370/346 |

FOREIGN PATENT DOCUMENTS

| | | |
|---|---|---|
| 663737 A2 | 7/1995 | European Pat. Off. . |
| 0713345A2 | 5/1996 | European Pat. Off. . |
| 19543253A1 | 5/1996 | Germany . |

*Primary Examiner*—Nguyen Vo
*Attorney, Agent, or Firm*—Coats & Bennett, PLLC

[57] ABSTRACT

The present invention provides a method for synchronizing transaction identifiers used by two mobile stations in a mobile communication system. A network station determines the transaction identifier used by each mobile station and sends a signalling message to each mobile station containing a counterpart transaction identifier element. The counterpart transaction identifier element which is sent to each mobile station contains the transaction identifier value which is used by the other mobile station to identify the connection. The counterpart transaction identifier is received and stored in each mobile station. When a signalling message containing a transaction identifier is sent from one mobile station to another, the mobile station inserts the counterpart transaction identifier rather than its own transaction identifier into the outgoing message. In this way, the receiving mobile station will recognize the signalling message as belonging to the connection.

15 Claims, 8 Drawing Sheets

METHOD FOR SYNCHRONIZING TRANSACTION IDENTIFIERS IN A MOBILE SATELLITE COMMUNICATION SYSTEM

FIELD OF THE INVENTION

The present invention relates generally to the field of mobile satellite communication systems, and more particularly, to signalling protocols used in a mobile satellite communication system to establish, maintain, and terminate connections.

BACKGROUND OF THE INVENTION

Satellite systems are playing an increasing role in mobile communications by providing coverage in zones where land-based infrastructures are unable or ineffective to supply mobile services. Satellite systems can, for example, provide coverage in large, sparsely-populated areas where it is not cost effective to implement network infrastructures. Satellite systems can also make services available to airborne and sea-based users. Another use of satellite systems is to back-up or supplement a land-based network. Satellite systems can continue to provide services to users when segments of the network infrastructure are down, can carry additional traffic during peak transmission periods when the land-based network is overloaded, and can fill-in holes in the coverage area of a land-based system caused by man-made or natural obstacles.

To meet their potential, satellite communication systems must provide reliable connections and must not experience frequent interruptions. As with conventional land-based mobile communications systems, satellite systems require a great deal of signalling overhead to establish, maintain, and terminate connections for all the services offered. The signalling protocols used in satellite systems are typically based on GSM, a derivative of Signalling System No. 7 (SSN7), which is adapted for the mobile environment. SSN7 is a protocol for fixed network signalling and exchange switching established by CCITT (International Telegraph and Telephone Consultative Committitee). For use in GSM and other mobile communication systems, SSN7 was adapted and extended, for example, by adding procedures to cope with the mobility of the user. The GSM technical specifications are published by the European Telecommunications Standard Institute (ETSI) and are incorporated in their entirety by reference herein.

The signalling protocol in GSM includes a large number of carefully defined signalling procedures. A signalling procedure consists of a series of signalling messages that are exchanged between various entities. The structure and elements of each signalling message are defined by the protocol. In the case of call control messages (which are used in the connection management sub-layer), the signalling message includes a transaction identifier which serves as a label for the transaction so that multiple transactions can be managed.

At the beginning of a transaction, a free TI is assigned to the transaction by the side of the interface initiating the transaction. The assigned TI value is used for the duration of the transaction and is released upon termination of the transaction. A mobile unit may support up to eight transactions at a time, distinguishing signalling messages belonging to different transactions by their TI values.

In satellite communication systems there is a problem with synchronizing transaction identifiers used by two mobile terminals during a single-hop connection. A single-hop connection in a satellite communication system is a connection between two mobile units. To establish a single-hop) connection, a dual-hop connection must first be established. The originating unit first connects to the network via the satellite which then connects to the terminating mobile unit via the satellite. Each of the call setup connections, originating mobile-to-network and network-to-terminating mobile, is assigned a TI value. At the end of the call setup signalling, the network commands both mobile units to connect to a single radio channel to establish the single-hop connection between the mobile units. There is no guarantee that the TI value used by each mobile station to identify the transaction will match each other. If the TI values do not match, then the mobile units will not be able to recognize signalling messages from the other mobile unit during the single-hop connection. The mobile units could be instructed to ignore the TI values during a single-hop connection. However, if the TI value is ignored, then only one transaction could be handled at a time. This would severely restrict the services that could be provided over the network.

There are several possible solutions to the problem described above. Since the same mobile switching center (MSC) manages the initial connections to the network by each of the mobile units, it would be possible for the MSC to choose a transaction identifier which is not being used by either mobile unit and command the mobile units to use that transaction identifier. This approach, however, requires new MSC functionality. Another solution would be for the mobile unit to agree upon a new transaction identifier after the mobile unit has connected to the radio channel. This solution, however, would require new signalling messages and would prolong the call setup time.

SUMMARY AND OBJECTS OF THE INVENTION

The present invention provides a new signalling method for synchronizing the transaction identifiers used by two mobile units involved in a single-hop connection. To establish a connection, the originating unit initiates the mobile-originated call establishment procedure to connect to the network. The originating unit assigns a TI to this transaction. The network in turn initiates the mobile-terminated call establishment procedure to connect the called terminal to the network. The network assigns a TI to this transaction, which may be different then the TI used by the originating unit. Once the called terminal is connected to the network, the network will know the TI values used by each mobile unit. To synchronize the TI values, the signalling method of the present invention uses a new three-bit long information field called the counterpart transaction identifier (CPTI). The CPTI field is inserted by the network preferably in a layer-three message either as a new information element or as part of an existing information element. The CPTI sent by the network to the originating terminal contains the TI value used by the called terminal. Similarly, the CPTI sent by the network to the called terminal includes the TI value used by the originating terminal. Each mobile unit will read and interpret the CPTI as the TI value used by the other terminal in its current connection to the network. This CPTI is stored in the mobile unit and shall be used when the connection is converted to a single-hop connection. Once a single-hop connection is established, each mobile unit inserts the CPTI value, if different from its own TI value, into all outgoing call control messages and call-related supplementary services messages belonging to the single-hop connection. In this way, received messages shall always have a correct Ti value and shall be directed and handled by the receiving layer-three peer in a consistent manner.

One advantage of the signalling method of the present invention is that its implementation is primarily in the mobile units. The MSC is required to support only one new information element which is added to an existing layer-three signalling message. The signalling method of the present invention can be implemented in both the MSC and the mobile units with existing hardware. Mobile communication systems which implement the signalling method of the present invention allow mobile units to manage multiple transactions even during single-hop connections. Thus, the present invention allows additional services to be provided which otherwise could not be supported in current satellite communication systems.

DETAILED DESCRIPTION OF THE INVENTION

Figure 1:
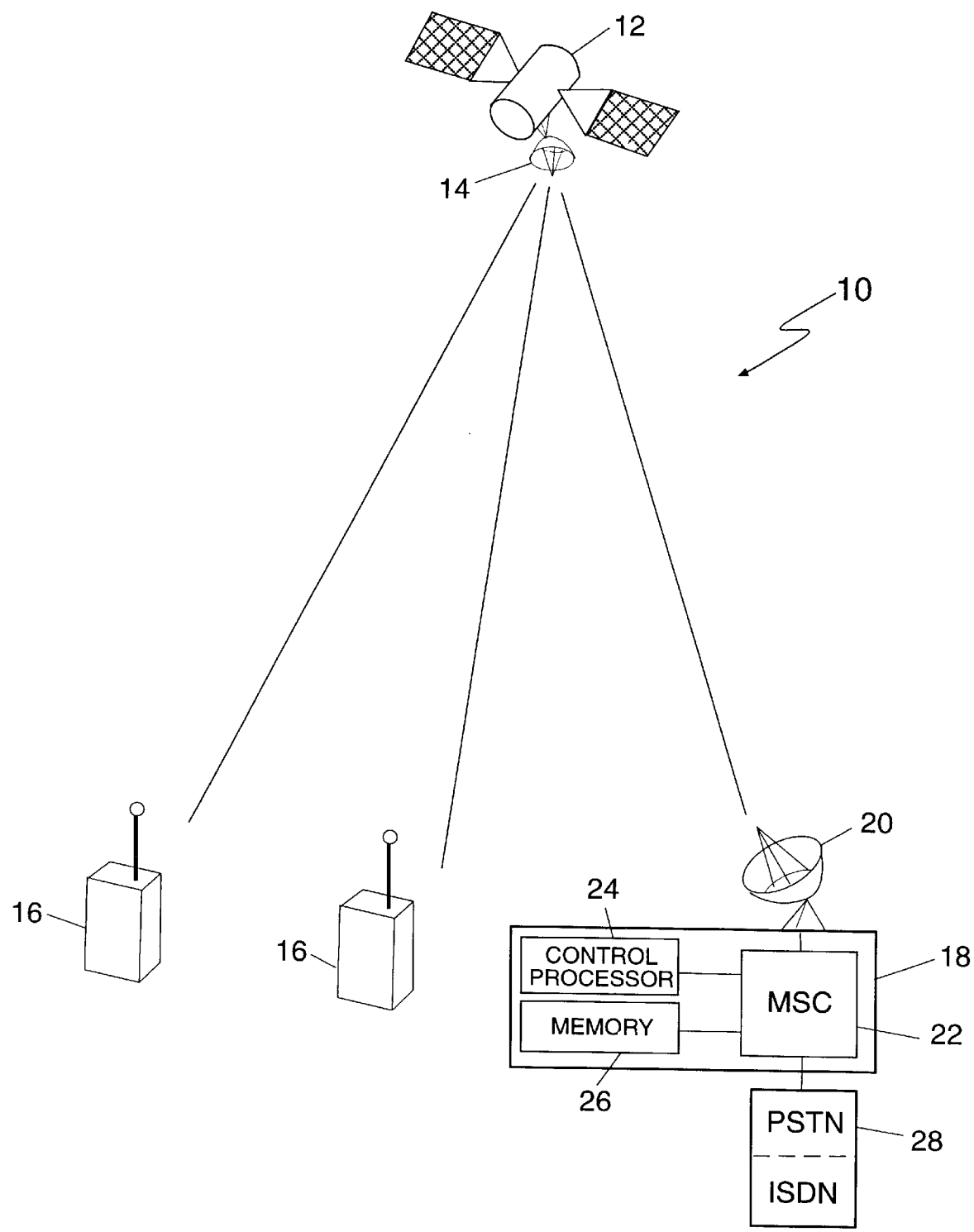
FIG. 1 is a schematic illustration of a satellite communication system in which the signalling method of the present invention is implemented.

Referring now to the drawings, a signalling method will be described for synchronizing the transaction identifiers used by mobile units in a mobile satellite communication system. A mobile satellite communication system which utilizes the signalling method of the present invention is shown in FIG. 1 and is indicated generally by the numeral 10. The satellite system 10 includes a space-based satellite 12 having a multiple-beam antenna 14 which projects a plurality of spot beams onto the surface of the earth to provide a communication medium for communications between earth stations. The earth stations in the satellite communication system 10 include both mobile stations 16 and at least one network station 18. The network station 18 includes a mobile switching center (MSC 22) which provides a connection to the public switched telephone network (PSTN), or other terrestrial network. The MSC 22 includes a control processor 24 and memory devices 26 to control its operation and to handle signalling as will be hereinafter described. The network station 18 also includes a home location register (HLR) and a visitor location register (VLR) which are used by the MSC to store miscellaneous subscriber information and authenticate users and monitor the location of individual users. Since the basic architecture of satellite communication systems is well-known to those skilled in the art, further discussion of the same is omitted for the sake of brevity.

Figure 2:
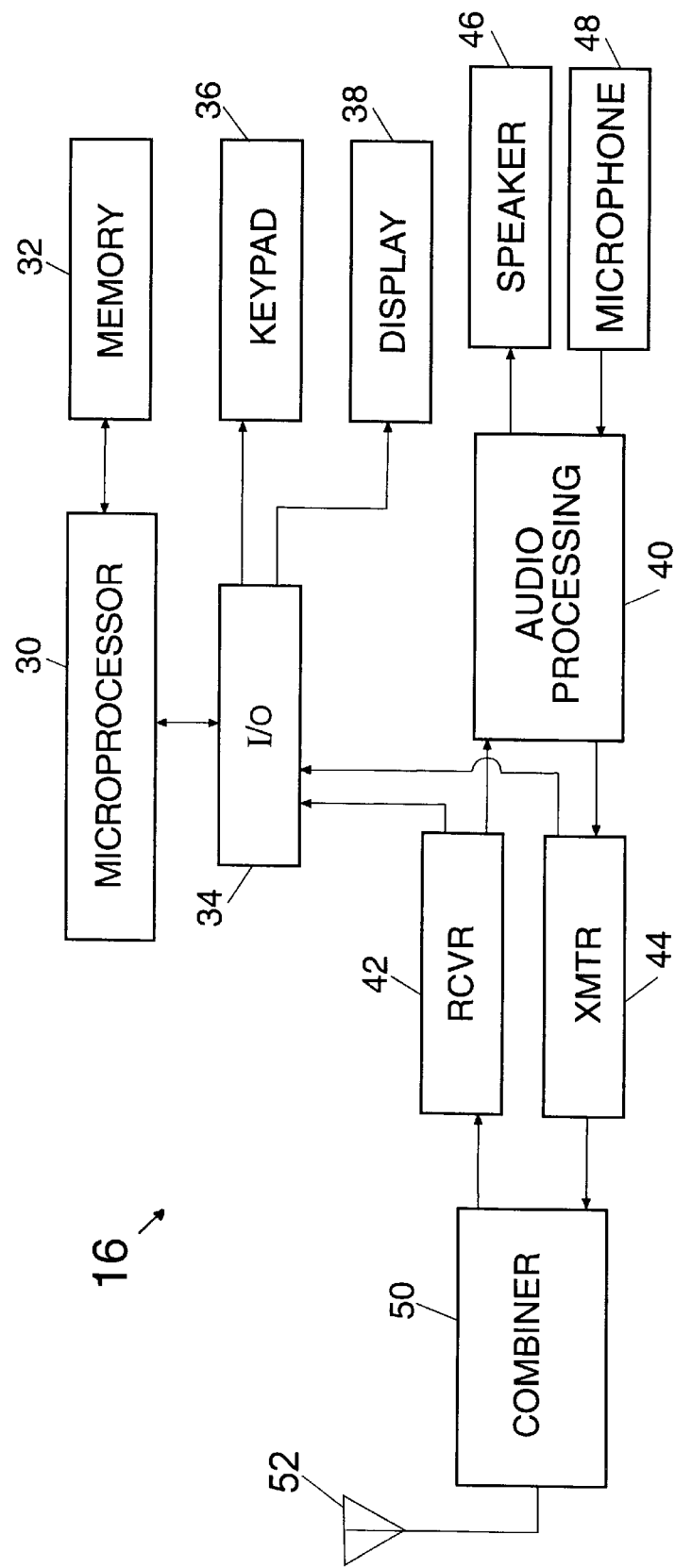
FIG. 2 is a schematic diagram illustrating a mobile unit in which the signalling method of the present invention is implemented.

Referring now to FIG. 2, there is shown the typical architecture of a mobile unit 16 which uses the signalling method of the present invention. The mobile unit 16 includes a microprocessor 30 for controlling the operation of the mobile unit 16 and a program memory 32 for storing programs used by the mobile unit 16. Input/output circuits 34 interface the microprocessor 30 with a keypad 36, a display 38, audio processing circuits 40, a receiver 42, and transmitter 44. The audio processing circuits 40 provide audio outputs to the speaker 46 and accept audio inputs from the microphone 48. A, conventional signal combiner 50 permits two-way, fully duplex communication of a common antenna 52.

Figure 3:
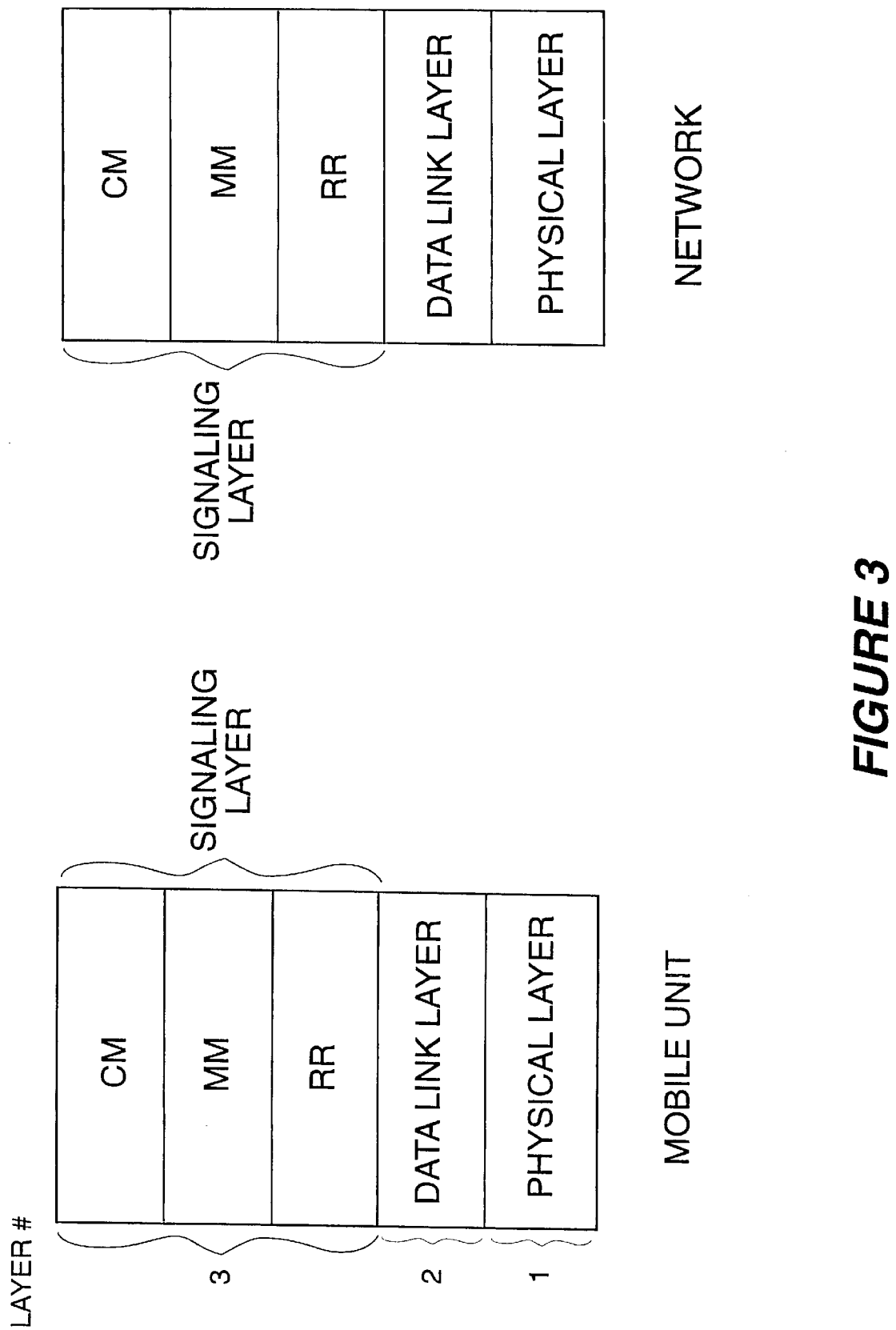
FIG. 3 is a schematic diagram illustrating the protocol architecture in which the signalling method of the present invention is implemented.

The communication protocol used to enable communications between the mobile station 16 and the network station 18 is a layered protocol. The layered protocol used in the present invention is shown schematically in FIG. 3. The first layer of the signalling protocol is the physical layer. The physical layer is responsible for providing the physical characteristics to the data and the data bearers needed to transmit the data over the interface. Layer two is the data link layer. The data link layer is responsible for sequencing the transmitted data, transmission, error detection and error correction. The data link layer ensures that the data is successfully transmitted between stations. Layer three of the signalling protocol is the signalling layer. The signalling layer includes three sub-layers—the radio resources management (RR) layer, the mobility management (MM) layer, and the connections management (CM) layer. The RR layer oversees the establishment of a radio link between the mobile station and the network. The MM layer contains functions needed to deal with the mobility of the user, such as location updating, authentication, and security. The CM layer is responsible for call control, supplementary service management, and short message service management.

Figure 4:
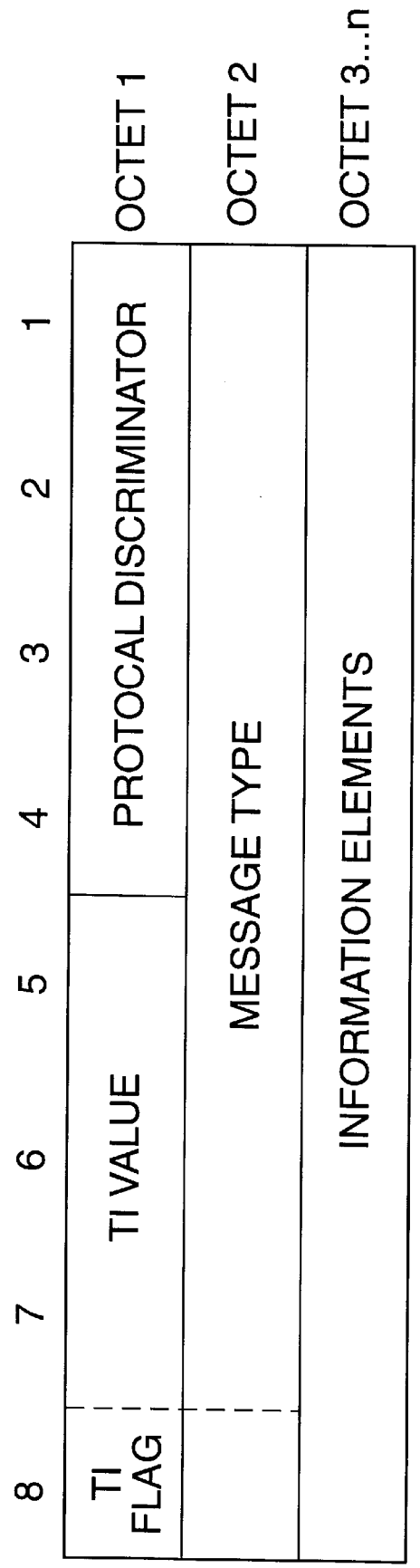
FIG. 4 is a diagram showing the message structure for layer three messages used in the signalling method of the present invention.

Within each of the sub-layers of the network layer, there are a number of carefully defined signalling procedures used to perform the tasks assigned to each sub-layer. A signalling procedure consists of a series of signalling messages which are exchanged between peer entities in the network layer. The structure and elements of each signalling message are defined by the protocol. The basic structure of a layer three signalling message is shown in FIG. 4.

The signalling message consists of a number of predefined elements each of which has a specific purpose. The elements of a signalling message are arranged in octets containing eight bits each. The first octet of the signalling message includes a transaction identifier (TI) and a protocol discriminator. The TI consists of two parts. The first part is a TI flag (TIF) which consists of a single bit. The TIF indicates which side of an interface initiates a transaction. The TIF uses bit eight in the first octet. The second part of the TI is the TI value. The TI value is a label used to identify the transaction so that multiple transactions can be managed. The TI value consists of three bits. Bits five, six and seven of the first octet are used to store the TI value. The protocol discriminator identifies the layer-three entity type the signalling message is addressed to. The protocol discriminator has a length of four bits and it identifies one of six protocols. The protocols include radio resources management, mobility management, call control, short message service, supplementary service, and test procedure. The protocol discriminator is used to route the signalling message to the appropriate layer-three entity type for handling. The message type indicates the function of the signalling message. The message type is located in the second octet in the signalling message. The message type includes six bits which are sufficient to address 64 different message types in a protocol.

The signalling message also contains one or more information elements. The number and type of information elements contained in a message depends on the message type. The information elements may be mandatory or optional, and have either a fixed or variable length. The mandatory information elements precede the optional information elements and have a reserved place in the structure of the signalling message.

In order to establish a connection between two mobile units, the originating unit initiates a procedure called the mobile-originated call setup procedure. At the time the mobile-originated call setup procedure is initiated, the originating mobile unit assigns a TI value which is used to identify signalling messages belonging to the transaction. After the originating unit has been authenticated, it sends the number to be called to the network. The network then initiates another procedure called the mobile-terminated call setup procedure to establish a connection with the paged mobile unit. At the time the mobile-terminated call setup procedure is initiated, the network assigns a TI value to be used by the paged mobile unit to identify signalling messages belonging to the transaction. The TI value assigned by the network may be different than the TI value assigned by the originating mobile unit.

Figure 5:
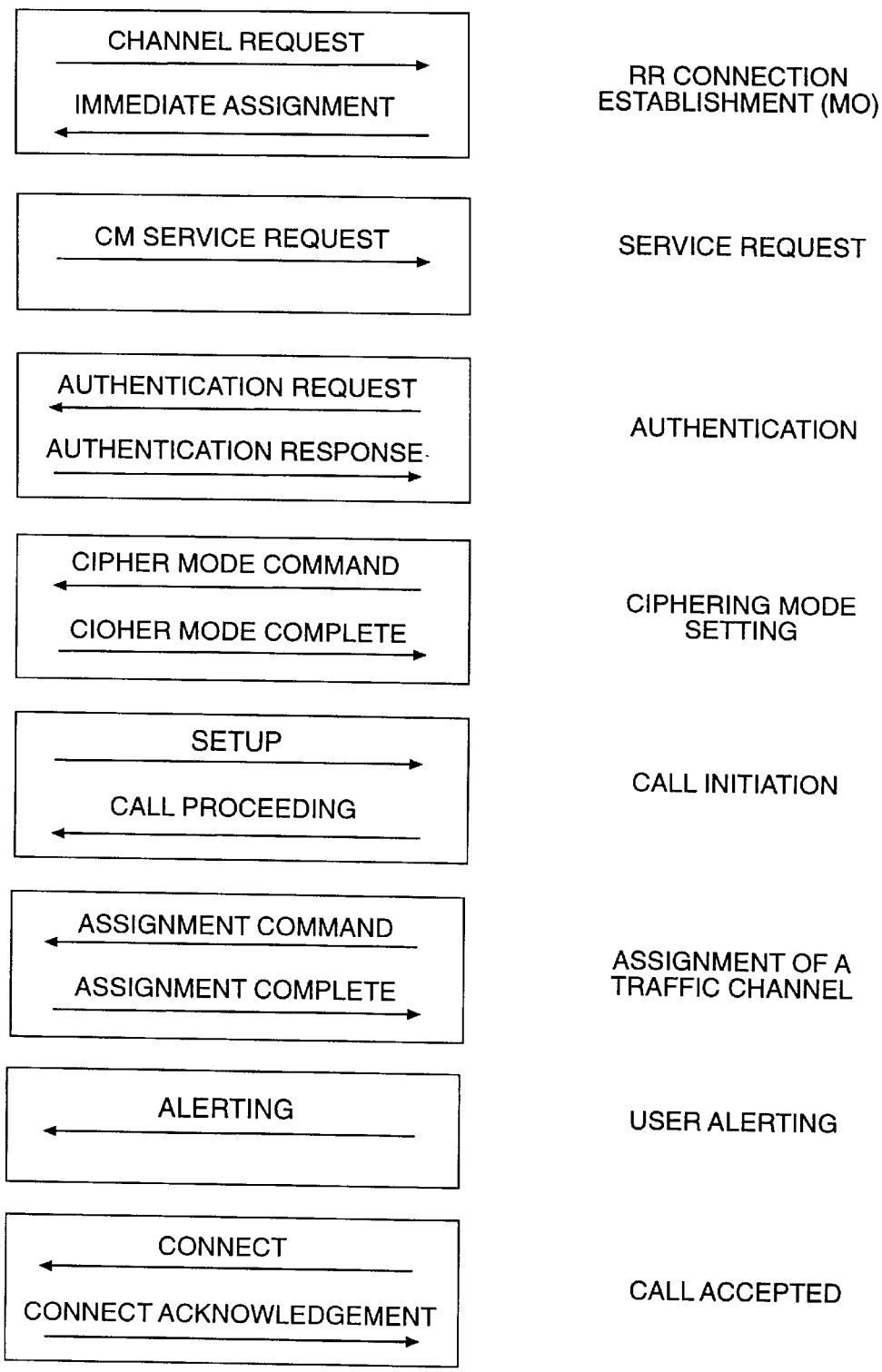
FIG. 5 is a diagram illustrating the mobile-originated call establishment signalling procedure in which the signalling method of the present invention is implemented.
Figure 6:
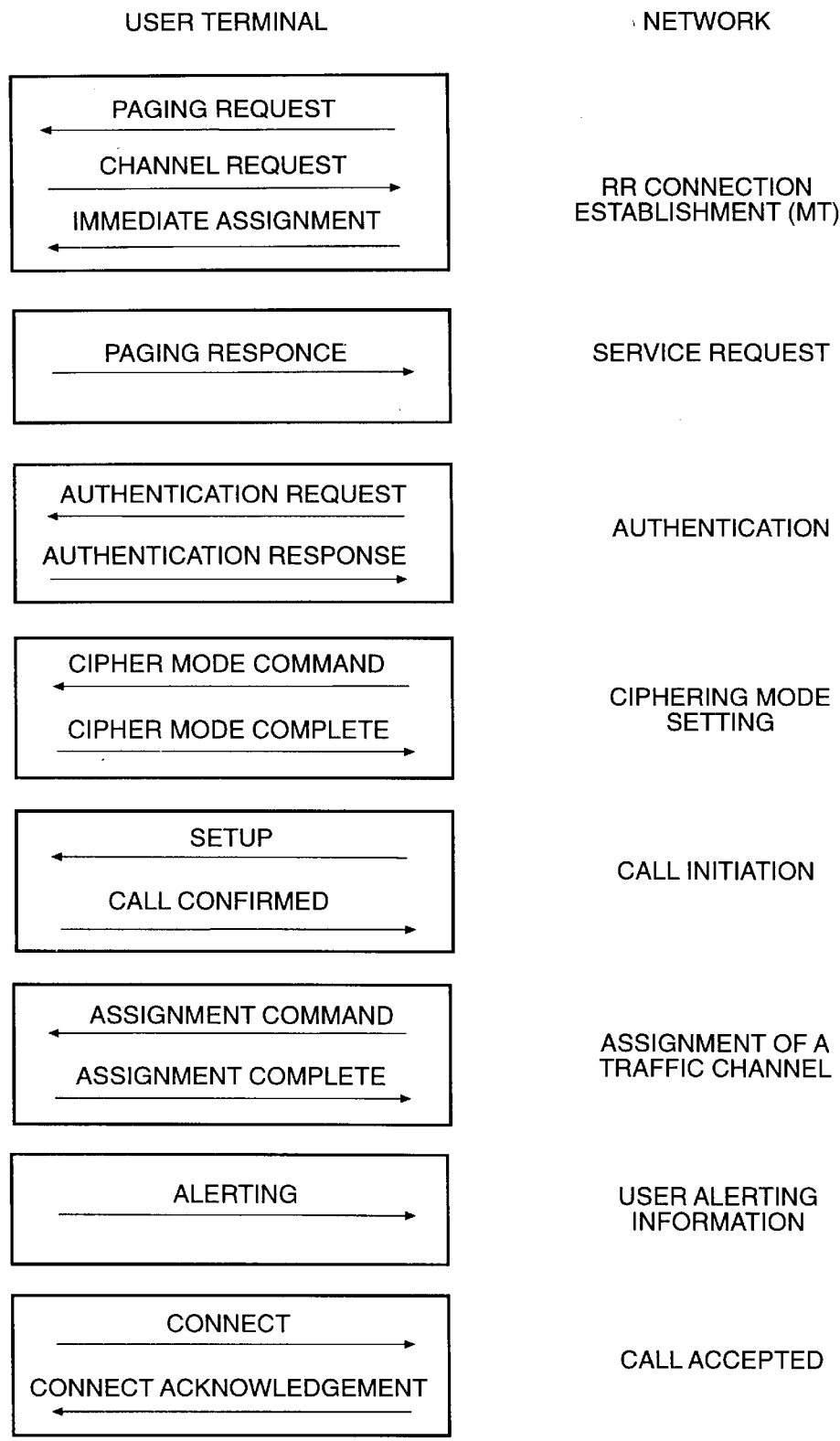
FIG. 6 is a diagram illustrating the mobile-terminated call establishment signalling procedure in which the signalling method of the present invention is implemented.

A number of signalling messages have to be exchanged between each mobile station and the network in order to establish a call connection. FIG. 5 shows the signalling messages exchanged during a mobile-originated call setup in the form of message types. FIG. 6 shows the signalling messages exchanged in the mobile-terminated call establishment procedures. Both procedures are defined in the GSM and digital satellite system technical specifications. During both procedures, the network sends an assignment command to the mobile unit to assign a traffic channel to be used by the mobile units to transmit the user data (e.g., speech). After the terminating mobile unit accepts the call, the mobile units both switch to the common assigned channel to establish a single-hop connection.

The call establishment procedures defined in GSM or in digital satellite systems do not ensure that the two mobile units will be using the same TI when a mobile-to-mobile connection is established. Without some modification, the mobile units would not be able to recognize signalling messages from each other. The current practice in some digital satellite systems is to instruct the mobile units to ignore the TI once a mobile-to-mobile connection is established. However, this practice prevents the mobile units from managing multiple transactions during a mobile-to-mobile connection. Thus, services which require the initiation of a new transaction, such as an incoming new call, cannot be implemented during a mobile-to-mobile connection.

The present invention provides a solution to this problem by including a new information element in the assignment command message which is sent by the network to each mobile unit during the mobile-originated arid mobile-terminated call establishment procedures. The assignment command message which is sent by the network to each of the mobile units is modified to include a counterpart transaction identifiers (CPTI) information element. The CPTI identifies the TI value used by the other mobile unit to identify its current connection. Thereafter, when a signalling message with a TI is sent by one mobile unit to another during a mobile-to-mobile connection, it inserts the CPTI into the TI value field of the out-going message. Thus, all such signalling messages received by one mobile unit from the other during a single-hop connection will always have a matching TI value.

As previously indicated, the CPTI information element is included preferably in the assignment command message. This is a new information element which is not contained in the GSM or digital satellite system signalling protocol.

Figure 7:
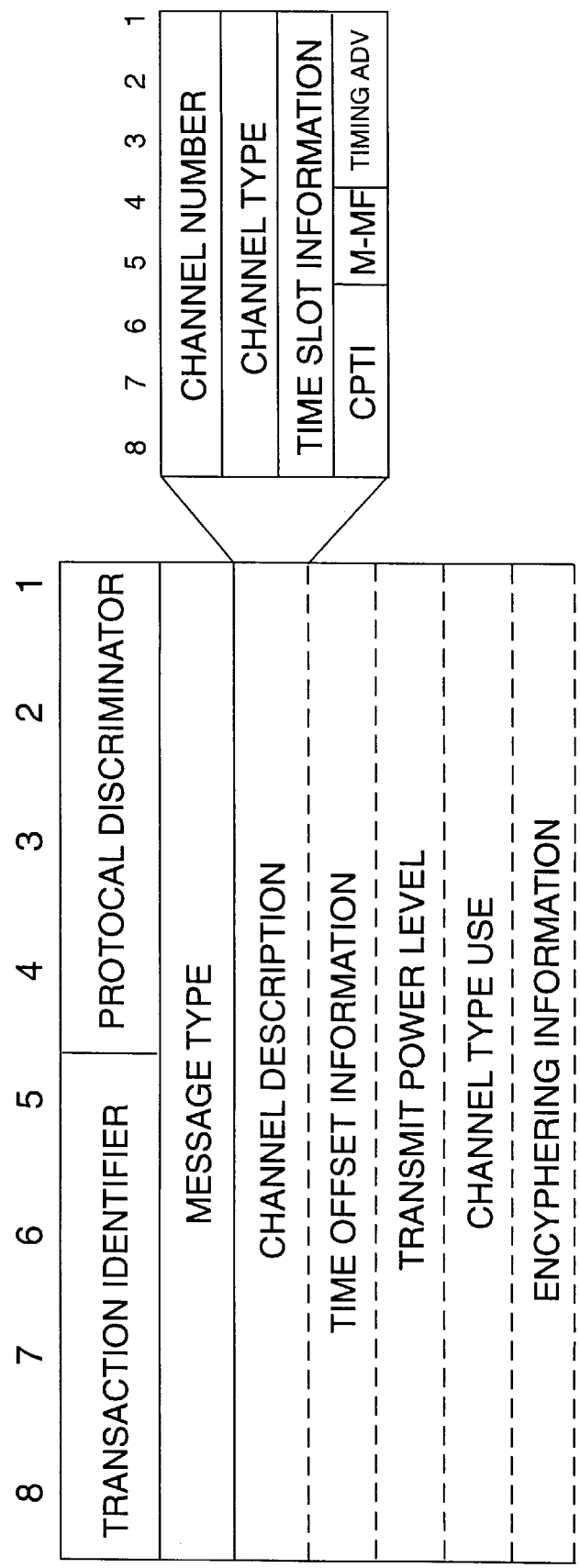
FIG. 7 is a diagram illustrating the message structure of the assignment command message which is used to implement the signalling method of the present invention.

FIG. 7 shows the message structure of the assignment command message used in the present invention. As with other signalling messages, the first octet of the assignment command message includes a protocol discriminator. The second octet contains the message type. The information elements in the assignment command message begin on the third octet. The information elements include a channel description element, a time offset information element, a transmit power level element, a channel-type use element and an encyphering information element. Each of these information elements may occupy multiple octets. For purposes of the present invention, the relevant information element is the channel description element.

The channel description element includes a channel number, channel type and time slot information which describes the channel to which the mobile unit is being assigned. The channel description element also contains the counterpart transaction identifier (CPTI) and a mobile-to-mobile flag (MMF). The MMF is used to indicate to the mobile unit that it will be involved in a mobile-to-mobile connection. This field exists in the Digital Satellite System signalling protocol which is incorporated herein by reference. The CPTI tells the mobile unit the TI value used by the other mobile unit to identify the transaction. Thus, the CPTI for the originating station will include the TI value for the called terminal. Similarly, the CPTI for the called terminal will include the TI value for the originating terminal.

Figure 8:
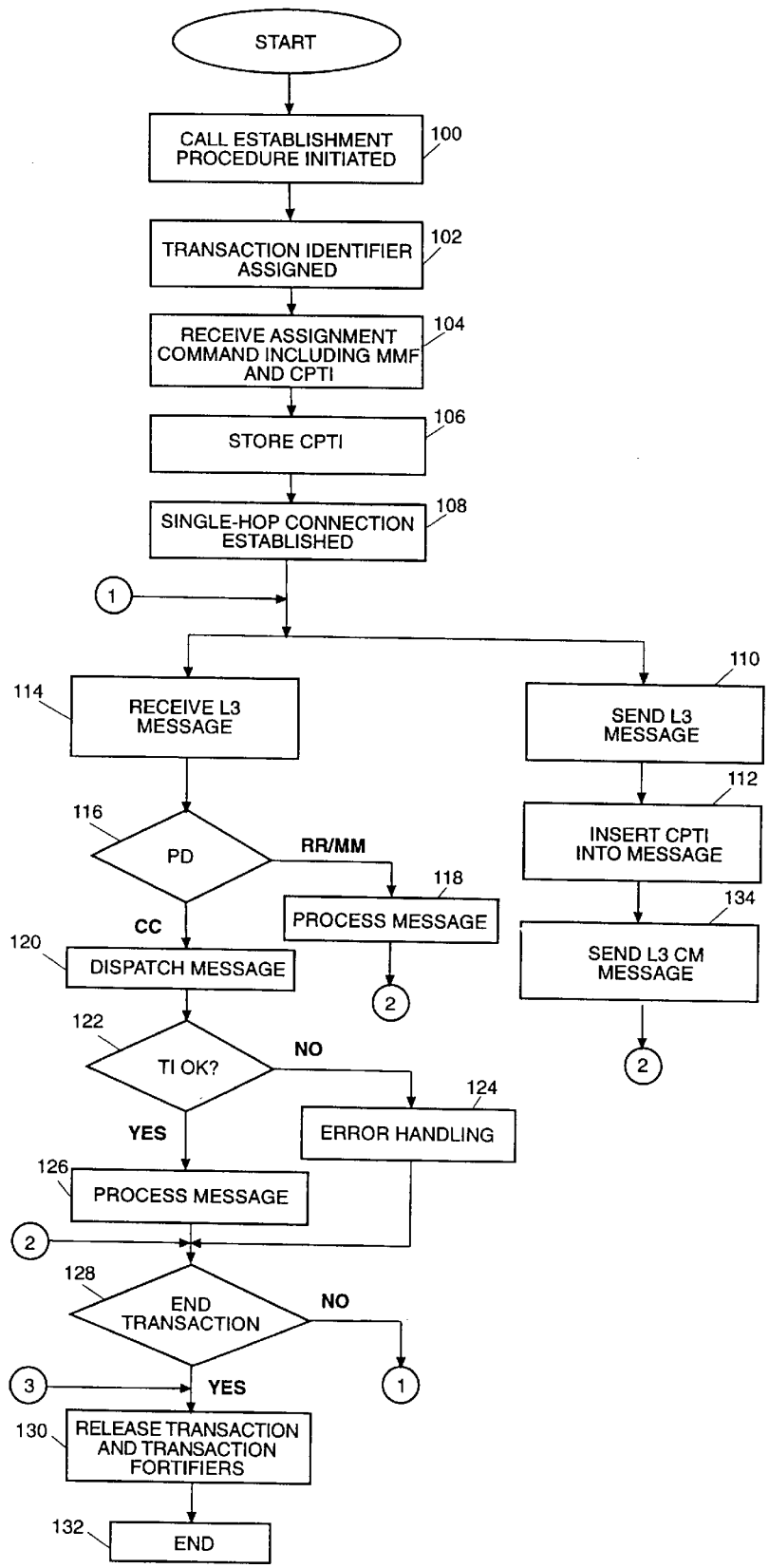
FIG. 8 is a flow diagram illustrating the signalling method of the present invention.

Referring now to FIG. 8, there is shown a flow diagram illustrating the allocation, synchronizing, and release of transaction identifiers. When a call-establishment procedure is initiated (block 100), a TI is assigned (block 102). At the time of initiation, another transaction of the same type may already be active in the mobile station. In the case of a mobile-originated call establishment procedure, a TI is assigned to the transaction for the corresponding protocol discriminator. For the mobile-terminated call establishment procedure, the mobile unit receives and accepts a TI assigned by the network. During the course of the call establishment procedure, the mobile unit receives an assignment command which contains a mobile-to-mobile flag and a counterpart transaction identifier (block 104). The mobile unit stores the counterpart TI for use in subsequent signalling procedures (block 106). Eventually, a single-hop connection is established between the two mobile units (block 108). Once a single-hop connection is established, the mobile units continue to exchange signalling messages. When a mobile unit receives a request to send a layer three signalling message with a TI during a single-hop connection (block 110), the CPTI is inserted into the TI value field of the outgoing message (block 112) before transmitting the message (block 134). When a mobile unit receives a layer-three signalling message during a single-hop connection (block 114), the protocol discriminator is examined to determine the appropriate layer three entity type addressed by the signalling message (block 116). For radio resource and mobility management signalling messages, the message is routed to the appropriate layer three entity and processed (block 118). Call control signalling messages are dispatched to the appropriate entity (block 120). After the call control message is dispatched, the TI is validated (block 122). If the TI is not valid, an error handling procedure is invoked (block 124) and tile transaction is terminated and/or the message is lost. If the TI is valid, the signalling message is processed (block 126). If the transaction is being terminated either normally or as a result of error handling (block 128), the mobile unit releases the TI (block 130) and terminates the transaction (block 132). When the TI is released, it is marked as available.

The signalling method of the present invention results in the synchronization of transaction identifiers used by two mobile units involved in a single-hop connection. Since the mobile units can identify signalling messages received from the other unit during the single-hop connection and dispatch them correctly to the appropriate internal unit or processing, it is possible to support multiple transactions of the same type. Thus, the signalling method of the present invention makes it possible to support multiple transactions for supplemental services, short message services and call-control (e.g., conversations) during a single-hop connection.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A signaling method for synchronizing transaction identifiers used by two mobile radio communication units in a mobile communication system to identify a mobile-to-mobile connection, said synchronizing method comprising:
   a) during a connection between a network and an originating mobile unit, assigning a first transaction identifier used by the originating mobile unit to identify signaling messages associated with said mobile-to-mobile connection;
   b) during a connection between said network and a terminating mobile unit, assigning a second transaction identifier used by the terminating mobile unit to identify signalling messages associated with said mobile-to-mobile connection, wherein the first and second transaction identifiers are assigned independently of each other;
   c) receiving at each mobile unit a signaling message including a counterpart transaction identifier that identifies the corresponding transaction identifier used by the other mobile unit;
   d) storing the corresponding counterpart transaction identifier in each mobile unit; and
   e) inserting the corresponding counterpart transaction identifier stored in said mobile unit into outgoing signaling messages requiring a transaction identifier sent by one of said mobile units to the other mobile unit during said mobile-to-mobile connection.

2. The signaling method according to claim 1 further including the step of connecting the originating mobile unit and terminating mobile unit to said network that assigns each mobile unit to a communication channel to establish said mobile-to-mobile connection.

3. The signalling method according to claim 2 wherein the originating mobile unit connects to said network by initiating a mobile-originated call establishment procedure, and wherein said network connects said terminating mobile unit to said network by initiating a mobile-terminated call establishment procedure.

4. The signalling method according to claim 3 wherein said originating mobile unit selects said first transaction identifier to identify its connection with said network, and wherein said network selects said second transaction identifier to identify the terminating mobile unit's connection to said network.

5. The signalling method according to claim 2 wherein said network transmits said signalling message to each mobile unit including said counterpart transaction identifier.

6. The signalling method according to claim 5 wherein the signalling message containing the counterpart transaction identifier is sent to each mobile unit during a call-establishment procedure.

7. The signalling method according to claim 6 wherein the counterpart transaction identifier is sent as part of an assignment command message.

8. The signalling method according to claim 7 wherein the counterpart transaction identifier comprises part of a channel description element of the assignment command message.

9. A signaling method for synchronizing transaction identifiers used by two mobile radio communication devices in a digital communication network to identify a mobile-to-mobile connection, said synchronizing method comprising:
   a) establishing a connection between an originating mobile station and said network;
   b) establishing a connection between a terminating mobile station and said network;
   c) assigning first and second transaction identifiers to be used by respective mobile units to identify signaling messages asssociated with the mobile to mobile connection;
   d) determining within the network the transaction identifier used by each mobile unit;
   e) sending a signaling message from the network to each mobile unit containing a counterpart transaction identifier that identifies the transaction identifier used by the other mobile unit;
   f) receiving at each mobile unit the signaling message containing said counterpart transaction identifier for the other mobile unit;
   g) storing the corresponding counterpart transaction identifier in each mobile unit; and
   h) at each mobile unit, inserting the counterpart transaction identifier stored in said mobile unit into an outgoing signaling message that requires a transaction identifier sent by said mobile unit to the other mobile unit during said mobile-to-mobile connection.

10. The signalling method according to claim 9 wherein the originating mobile unit connects to said network by initiating a mobile-originated call establishment procedure, and wherein said network connects said terminating mobile unit to said network by initiating a mobile-terminated call establishment procedure.

11. The signalling method according to claim 10 wherein said originating mobile unit selects said first transaction identifier to identify its connection with said network, and wherein said network selects said second transaction identifier to identify the terminating mobile unit's connection to said network.

12. The signalling method according to claim 9 wherein the signalling message containing the counterpart transaction identifier is sent to each mobile unit during a call-establishment procedure.

13. The signalling method according to claim 12 wherein the counterpart transaction identifier is sent as part of an assignment command message.

14. The signalling method according to claim 13 wherein the counterpart transaction identifier comprises part of a channel description element of the assignment command message.

15. A mobile communication system including a network station and a plurality of mobile stations, said mobile communication system further comprising:
   a) means for establishing a mobile-to-mobile connection between two of said mobile stations, wherein each of said mobile stations uses a separate transaction identifier to identify signaling messages associated with said mobile-to-mobile connection;
   b) means incorporated into said network station to determine the transaction identifier used by each mobile station to identify the mobile-to-mobile connection;
   c) means for transmitting from said network station to each of said mobile stations a signaling message including a counterpart transaction identifier, which contains the transaction identifier used by the other mobile station to identify the mobile-to-mobile connection;
   d) data storage means incorporated into each of said mobile stations to store said counterpart transaction identifier received from said network station; and
   e) signaling means incorporated into said mobile stations for transmitting signaling messages to the other mobile station during said mobile-to-mobile connection, said signaling means being operative to insert said counterpart transaction identifier into signaling messages transmitted to the other mobile station during a mobile-to-mobile connection.

* * * * *